(12) United States Patent
Fargano et al.

(10) Patent No.: US 10,651,929 B2
(45) Date of Patent: *May 12, 2020

(54) USE OF DYING GASP TO LOCATE FAULTS IN COMMUNICATION NETWORKS

(71) Applicant: CenturyLink Intellectual Property LLC, Denver, CO (US)

(72) Inventors: Mike Fargano, Louisville, CO (US); Michael D. Sprenger, Boulder, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/849,990

(22) Filed: Dec. 21, 2017

(65) Prior Publication Data
US 2018/0109313 A1   Apr. 19, 2018

Related U.S. Application Data

(63) Continuation of application No. 14/980,579, filed on Dec. 28, 2015, now Pat. No. 9,866,316, which is a
(Continued)

(51) Int. Cl.
*H04B 10/07* (2013.01)
*H04B 10/071* (2013.01)
(Continued)

(52) U.S. Cl.
CPC ....... *H04B 10/071* (2013.01); *H04B 10/0791* (2013.01); *H04B 10/07* (2013.01); *H04B 10/27* (2013.01); *H04J 14/02* (2013.01)

(58) Field of Classification Search
CPC .. H04B 10/071; H04B 10/0791; H04B 10/27; H04B 10/07; H04J 14/02
(Continued)

(56) References Cited

U.S. PATENT DOCUMENTS

| 5,309,448 A | 5/1994 | Bouloutas et al. |
| 5,519,830 A * | 5/1996 | Opoczynski ............... H04L 1/22 |
| | | 714/4.2 |

(Continued)

FOREIGN PATENT DOCUMENTS

WO   WO 2014-004881   1/2014

OTHER PUBLICATIONS

International Search Report and Written Opinion prepared by the Korean Intellectual Property Office as Intl Search Authority for PCT Intl Patent Appl. No. PCT/US13/48266, dated Oct. 18, 2013; 10 pages.

(Continued)

*Primary Examiner* — Dibson J Sanchez

(57) ABSTRACT

Novel tools and techniques that can be used to detect network impairment, including but not limited to impairment of optical fiber networks. In an aspect, such tools and techniques can be deployed at relatively low cost, allowing pervasive deployment throughout a network. In another aspect, such tools and techniques can take advantage of a "dying gasp," in which a network element detects a sudden drop in received optical (or electrical) power, resolution, etc. at short time scales and sends a notification across the network before the connection is completely compromised. In yet another aspect, some tools can include a supervisory function to analyze aspects of the dying gasp with the goal to determine network segments associated with an impairment and an estimate of the location of an impairment within the network.

14 Claims, 6 Drawing Sheets

Related U.S. Application Data continuation of application No. 14/582,535, filed on Dec. 24, 2014, now Pat. No. 9,246,582, which is a continuation of application No. 13/928,069, filed on Jun. 26, 2013, now Pat. No. 8,948,587.

(60) Provisional application No. 61/787,690, filed on Mar. 15, 2013, provisional application No. 61/665,182, filed on Jun. 27, 2012.

(51) Int. Cl.
  *H04B 10/079* (2013.01)
  *H04B 10/27* (2013.01)
  *H04J 14/02* (2006.01)

(58) Field of Classification Search
  USPC .......................................... 398/9–38, 43–103
  See application file for complete search history.

(56) References Cited

U.S. PATENT DOCUMENTS

| | | | |
|---|---|---|---|
| 5,523,868 A | 6/1996 | Hawley | |
| 5,615,033 A * | 3/1997 | Yoshida | H04B 10/0799 398/15 |
| 5,771,274 A | 6/1998 | Harris | |
| 5,884,017 A * | 3/1999 | Fee | H04J 14/0284 370/217 |
| 5,946,373 A | 8/1999 | Harris | |
| 5,965,876 A | 10/1999 | Anemogiannis et al. | |
| 6,108,112 A | 8/2000 | Touma | |
| 6,124,790 A * | 9/2000 | Golov | H04L 41/0604 340/500 |
| 6,253,339 B1 | 6/2001 | Tse et al. | |
| 6,263,455 B1 | 7/2001 | Bannister | |
| 6,269,204 B1 | 7/2001 | Ishikawa | |
| 6,285,475 B1 | 9/2001 | Fee | |
| 6,381,011 B1 | 4/2002 | Nickelsberg et al. | |
| 6,614,968 B1 | 9/2003 | Eslambolchi | |
| 6,623,185 B1 | 9/2003 | Peragine | |
| 7,287,175 B2 | 10/2007 | Vereen et al. | |
| 7,302,352 B2 | 11/2007 | Chuang | |
| 7,536,102 B1 | 5/2009 | Huffman et al. | |
| 7,684,702 B2 | 3/2010 | Lu | |
| 7,756,418 B2 | 7/2010 | Ofalt et al. | |
| 7,835,272 B1 | 11/2010 | Johnson et al. | |
| 7,933,518 B2 | 4/2011 | Li et al. | |
| 8,285,139 B2 | 10/2012 | Zhou | |
| 8,532,482 B2 | 9/2013 | Yang | |
| 8,655,167 B1 | 2/2014 | Lam et al. | |
| 8,818,192 B1 * | 8/2014 | Smith | H04B 10/808 398/171 |
| 8,948,587 B2 | 2/2015 | Fargano et al. | |
| 9,007,228 B2 * | 4/2015 | Song | G08B 21/185 340/657 |
| 9,246,582 B2 | 1/2016 | Fargano et al. | |
| 9,866,316 B2 | 1/2018 | Fargano et al. | |
| 2002/0066850 A1 | 6/2002 | Wu et al. | |
| 2002/0176130 A1 | 11/2002 | Maeno | |
| 2003/0164724 A1 | 9/2003 | Momtaz et al. | |
| 2003/0210908 A1 | 11/2003 | Levy et al. | |
| 2004/0001721 A1 | 1/2004 | Bethea et al. | |
| 2004/0033077 A1 * | 2/2004 | Kim | H04Q 11/0067 398/72 |
| 2004/0208507 A1 | 10/2004 | Saunders | |
| 2005/0086336 A1 | 4/2005 | Haber | |
| 2005/0146426 A1 | 7/2005 | Pereira et al. | |
| 2006/0051088 A1 * | 3/2006 | Lee | H04B 10/00 398/31 |
| 2007/0140689 A1 * | 6/2007 | Haran | H04B 10/0793 398/27 |
| 2007/0147836 A1 | 6/2007 | Dong | |
| 2007/0154215 A1 | 7/2007 | Zuhdi | |
| 2008/0002718 A1 * | 1/2008 | Bernard | H04Q 11/0067 370/395.51 |
| 2008/0019286 A1 | 1/2008 | Wurst et al. | |
| 2008/0117068 A1 | 5/2008 | Sandstrom | |
| 2008/0175588 A1 * | 7/2008 | Bernard | H04L 41/069 398/17 |
| 2008/0195881 A1 | 8/2008 | Bernard | |
| 2008/0240714 A1 | 10/2008 | Tsukahara | |
| 2008/0291196 A1 | 11/2008 | Ceruti et al. | |
| 2008/0292312 A1 | 11/2008 | Oron et al. | |
| 2008/0294989 A1 | 11/2008 | Ceruti et al. | |
| 2008/0304823 A1 | 12/2008 | Mahony | |
| 2008/0304825 A1 | 12/2008 | Mahony et al. | |
| 2008/0317462 A1 | 12/2008 | Chi | |
| 2009/0010643 A1 | 1/2009 | DeLew et al. | |
| 2009/0028553 A1 | 1/2009 | Oron | |
| 2009/0060496 A1 | 3/2009 | Liu et al. | |
| 2009/0092388 A1 | 4/2009 | Yang | |
| 2009/0129773 A1 | 5/2009 | Oron | |
| 2009/0164550 A1 | 6/2009 | Rahrer et al. | |
| 2009/0190921 A1 | 7/2009 | Nakajima et al. | |
| 2009/0238558 A1 | 9/2009 | Katayama et al. | |
| 2009/0282292 A1 * | 11/2009 | Squire | H04L 41/0631 714/39 |
| 2009/0285106 A1 | 11/2009 | Bernard et al. | |
| 2009/0290868 A1 * | 11/2009 | Yin | H04Q 11/0067 398/16 |
| 2010/0135652 A1 | 6/2010 | Jiang et al. | |
| 2010/0150546 A1 | 6/2010 | Shrikhande et al. | |
| 2010/0189440 A1 | 7/2010 | Julien et al. | |
| 2010/0215359 A1 | 8/2010 | Li et al. | |
| 2010/0272433 A1 | 10/2010 | Shaffer et al. | |
| 2011/0013904 A1 | 1/2011 | Khermosh et al. | |
| 2011/0076012 A1 * | 3/2011 | Na | H04B 10/0799 398/23 |
| 2011/0255860 A1 | 10/2011 | Lee et al. | |
| 2011/0280568 A1 | 11/2011 | Dvir et al. | |
| 2012/0002959 A1 | 1/2012 | Melamed | |
| 2012/0045205 A1 | 2/2012 | Perron | |
| 2012/0052857 A1 * | 3/2012 | Kumar | H04W 24/08 455/424 |
| 2012/0163800 A1 | 6/2012 | Urban | |
| 2012/0224846 A1 * | 9/2012 | Swanson | H04L 43/0852 398/13 |
| 2012/0236294 A1 | 9/2012 | Smith | |
| 2013/0058206 A1 * | 3/2013 | San Filippo, III | H02J 3/00 370/216 |
| 2013/0128750 A1 * | 5/2013 | Krzanowski | H04L 41/0213 370/241.1 |
| 2013/0257623 A1 | 10/2013 | Bagasra | |
| 2013/0259471 A1 * | 10/2013 | Wang | H04B 10/07955 398/38 |
| 2014/0003804 A1 | 1/2014 | Fargano et al. | |
| 2014/0006871 A1 | 1/2014 | Lakshmanan | |
| 2014/0010529 A1 * | 1/2014 | Shin | H04B 10/27 398/71 |
| 2014/0056582 A1 | 2/2014 | Roberts | |
| 2014/0133844 A1 * | 5/2014 | Dahlfort | H04L 43/0811 398/10 |
| 2014/0147108 A1 | 5/2014 | Zang et al. | |
| 2014/0369676 A1 * | 12/2014 | Hamaoka | H04L 12/2861 398/25 |
| 2015/0117852 A1 | 4/2015 | Fargano et al. | |
| 2016/0112120 A1 | 4/2016 | Fargano et al. | |
| 2016/0380857 A1 * | 12/2016 | Wang | H04L 12/185 398/25 |

OTHER PUBLICATIONS

International Appl. No. PCT/US2013/048266; Notice of Publication dated Jan. 3, 2014; 1 page.

International App. No. PCT/US2013/048266; Preliminary Report on Patentability dated Jan. 8, 2015; 7 pages.

\* cited by examiner

USE OF DYING GASP TO LOCATE FAULTS IN COMMUNICATION NETWORKS

CROSS-REFERENCE TO RELATED APPLICATIONS

This application is a continuation of U.S. patent application Ser. No. 14/980,579, filed Dec. 28, 2017 by Fargano et al. and entitled, "Use of Dying Gasp to Locate Faults in Communications Networks", which is a continuation of U.S. patent application Ser. No. 14/582,535 (now U.S. Pat. No. 9,246,582), filed Dec. 24, 2014 by Fargano et al. and entitled, "Use of Dying Gasp to Locate Faults in Communications Networks", which is a continuation of U.S. patent application Ser. No. 13/928,069 (now U.S. Pat. No. 8,948,587), filed Jun. 26, 2013 by Fargano et al. and entitled, "Use of Dying Gasp to Locate Faults in Communications Networks", which claims the benefit, under 35 U.S.C. § 119, to provisional U.S. patent application Ser. No. 61/665,182, filed Jun. 27, 2012 by Fargano et al. and entitled "Use of Dying Gasp to Locate Fiber Faults in Passive Optical Networks" and provisional U.S. patent application Ser. No. 61/787,690, filed Mar. 15, 2013 by Fargano et al. and entitled "Use of Dying Gasp to Locate Faults in Communication Networks", the entire disclosures of each are incorporated herein by reference.

BACKGROUND

The current state of the art for fiber impairment isolation requires dedicated equipment, commonly referred to as Optical Time Domain Reflectometers ("OTDRs") to send short laser pulses into an optical fiber, with the goal of detecting reflections from discontinuities such as connectors, splice points, kinks, sharp bends, fiber faults, etc. Current OTDRs are costly precision instruments and allow detection of fiber discontinuities to within a few meters or less.

This dedicated equipment is expensive to deploy, however, and therefore is difficult to use in a preventative capacity. Hence, there is a need for impairment detection solutions that can be deployed at lower cost throughout a network.

SUMMARY

A set of embodiments provides tools and techniques that can be used to detect network impairment, including but not limited to impairment of optical fiber networks. In an aspect, such tools and techniques can be deployed at relatively low cost, allowing pervasive deployment throughout a network. In another aspect, such tools and techniques can take advantage of a "dying gasp," in which a network element detects a sudden drop in received optical (or electrical) power, resolution, etc. at short time scales and sends a notification across the network before the connection is completely compromised. As another aspect, some embodiments can include a supervisory function to analyze aspects of the dying gasp with the goal to determine network segments associated with an impairment and an estimate of the location of an impairment within the network.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, one set of embodiments provides methods, including without limitation methods of estimating a location of an impairment in a network. In a particular embodiment, the network might be an optical network, such as a passive optical network ("PON"), to name one example of many.

An exemplary method might comprise receiving (e.g., at a computer system) one or more dying gasp communications. In an aspect, the one or more dying gasp communications might comprise at least one communication from a network element in the optical network. The method might further comprise determining, with the computer system, based at least in part on the one or more dying gasp communications, that a network impairment has occurred. In some embodiments, the method can also include identifying, with the computer system, based at least in part on the one or more dying gasp communications, an approximate location of the network impairment.

Another set of embodiments provides apparatus. An exemplary apparatus might comprise a non-transitory computer readable medium having encoded thereon a set of instructions executable by one or more computers to perform one or more operations, including without limitation operations in accordance with methods provided by other embodiments. Merely by way of example, the set of instructions might comprise instructions to receive one or more dying gasp communications, which might include at least one communication from a network element in a network. The set of instructions might further comprise instructions to determine, based at least in part on the one or more dying gasp communications, that a network impairment has occurred, and/or instructions to identify, based at least in part on the one or more dying gasp communications, an approximate location of the network impairment.

A further set of embodiments provides systems, including without limitation computer systems. An exemplary system might comprise one or more processors and/or a non-transitory computer readable medium in communication with the one or more processors. In an aspect, the computer readable medium can have encoded thereon a set of instructions executable by the computer to perform one or more operations, including without limitation operations in accordance with methods provided by other embodiments. For instance, the set of instructions might comprise instructions to receive one or more dying gasp communications, which might include at least one communication from a network element in a network. The set of instructions might further comprise instructions to determine, based at least in part on the one or more dying gasp communications, that a network impairment has occurred, and/or instructions to identify, based at least in part on the one or more dying gasp communications, an approximate location of the network impairment.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
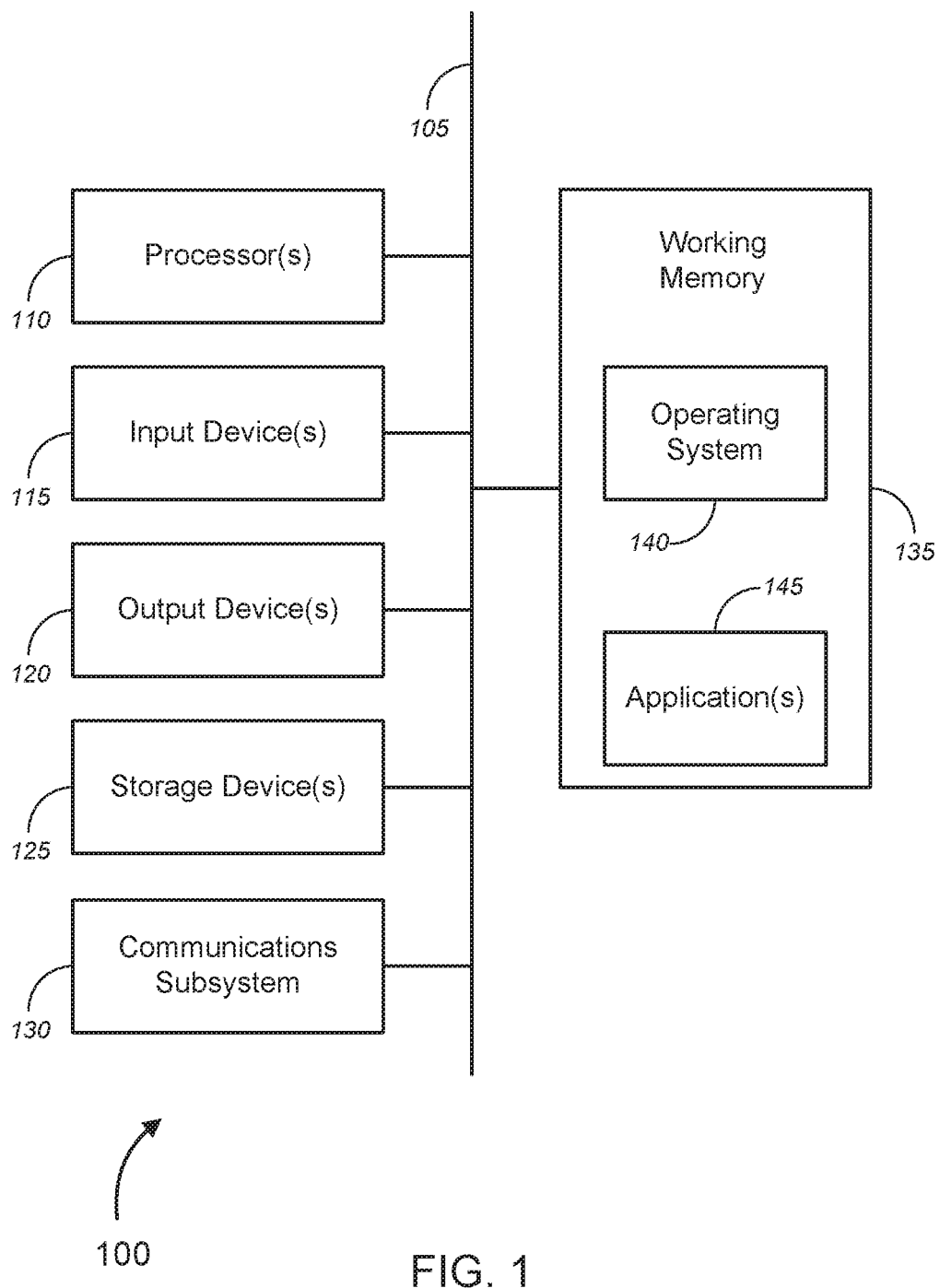
FIG. 1 is a generalized schematic diagram illustrating a computer system, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Although the various figures and embodiments described below are directed to Passive Optical Networks ("PONs"), the various embodiments are not so limited, and may be applicable to any suitable network including, without limitation, non-PONs optical networks, coaxial cable networks, or any other suitable communications network, and the like.

Various embodiments of the concept of fiber impairment isolation might rely on network equipment to send out a so-called dying gasp as it detects a sudden drop in received optical power at short time scales (likely less than 1 second). As another aspect, some embodiments can include a supervisory function to analyze aspects of the dying gasp with the goal to determine fiber segments associated with a fiber impairment and an estimate of the location of an impairment within a fiber segment. Embodiments can include devices that can provide a dying gasp, devices and/or systems that can collect and interpret dying gasp information, and methods of providing, collecting, and/or interpreting dying gasp information.

This concept does not rely on dedicated hardware, and may offer lower resolution than dedicated OTDRs, but has the advantage that it can be implemented entirely in software and therefore resulting in lower costs. The dying gasp fiber impairment detection method thus has the potential of a much lower cost implementation. This technology can be employed in a wide variety of applications, including without limitation any type of Passive Optical Network ("PON") type of technology as well as variations thereof. Examples include, but are not limited to, ITU-T APON, BPON, GPON, NG-PON1, NG-PON2, XG-PON1, XG-PON2, IEEE EPON, GE-PON (1 Gbps, 10 Gbps variants and faster, should these ever emerge), RF over Glass ("RFoG"), Ethernet PON over Coax ("EPoC"), Fiber in Gas ("FiG"), or the like. Any vendor of PON products could potentially implement the dying gasp fiber fault detection mechanism. Any operator who deploys PON equipment could potentially deploy this technology as well. The basic layout of a generic PON architecture is shown, for example, in FIG. 2.

More specifically, certain embodiments utilize the "dying gasp" of network equipment in a PON system (Passive Optical Network) to provide fiber impairment identification (e.g., segment identification or approximate location within segment). An application of the dying gasp is described herein beyond merely using a dying gasp to detect equipment faults (i.e., a simple determination whether equipment is faulty or not) in routers, fiber-optic and other types of cables, and other network equipment (although that is possible in certain embodiments as well). In an aspect, certain embodiments use the time stamp and/or other information in the dying gasp in conjunction with an Operations Support System ("OSS") to provide a location estimation of a fiber impairment. At least two levels of accuracy are conceivable in accordance with different embodiments: (1) Determination of fiber impairment location by fiber segment (e.g., feeder, distribution, drop, etc.) by taking advantage of information about the dying gasp signal's origin information; and (2) Estimation of fiber impairment location within a segment by taking advantage of timing information contained within the dying gasp.

In an aspect, by correlating information about dying gasp events of various network elements at the Operations Support System ("OSS") level or some other supervisory software layer or system abstraction level, an operator could gain considerable information about the location of a fiber, connector or splicing impairment, or other type of Outside Plant ("OSP") impairment, without requiring potentially costly, complex and resource-intensive hardware such as dedicated OTDR units. Such network elements could include (but are not limited to): (a) ONT—Optical Network Terminals; (b) ONU—Optical Network Units; (c) OLT—Optical Line Terminals. Types of analysis that could be performed by various embodiments include, but are not limited to, the following: (1) Receiving a dying gasp of only a single ONT/ONU would indicate an impairment in the fiber drop to a specific subscriber; (2) Receiving dying gasps of multiple ONTs/ONUs simultaneously or near simultaneously might indicate a fiber impairment in the distribution to the PON splitter; and (3) Receiving a dying gasp from an OLT would indicate a fiber fault in the backhaul from the OLT. Examples of these techniques are described in further detail below in the context of FIGS. 3-5.

In other embodiments, additional information might be extracted from various aspects of the dying gasp information available at various protocol levels (e.g., absolute time stamp, flight time, etc.), including information that might be added as the dying gasp propagates through various protocol layers, network elements and system hardware. Various embodiments might also collect data from additional sources of information related to the dying gasp, as well as additional levels of analysis and impairment location that could be derived from such information. The dying gasp, in aspects of certain embodiments, could be generated by network elements based on real-time observation of the optical receiver power at sufficiently fine-grained time intervals.

Some embodiments might feature additional functionality. For instance, in some implementations, the system might be configured to cross-reference the dying gasp signal with a carrier's databases. By cross-referencing the dying gasp signal with a carrier's existing databases containing information about fiber routes and length of individual segments at the OSS or Management System level, additional detail about fault location and fiber route can be made available. By combining time stamps and dying gasp information with known lengths of deployed fiber segments, the system's accuracy of locating potential fiber faults can be improved.

Additionally and/or alternatively, some embodiments might provide additional accuracy improvement via absolute or cyclical time stamps. Merely by way of example, by inserting an absolute or cyclical time stamp at the transmitter side, additional accuracy can be gained by correlating time stamps with time of flight information and known lengths of fiber links. The size of a cyclical counter or cyclical time stamp (in bits) might depend on the desired fault location accuracy and the desired reoccurrence period. For example, a 32-bit counter with microsecond resolution (one count every microsecond) might turn over every 1 hour and 12 minutes. A 64-bit counter with nanosecond resolution (one count every nanosecond) might turn over approximately once every 585 years. As mentioned above, a nanosecond temporal resolution might be sufficient to resolve spatial resolution down to approximately 20 cm.

Furthermore, although the concept of a dying gasp is being explored in the context of a new, yet to be finalized NG-PON2 standard, it could retroactively be applied to the other PON standards, should the dying gasp ever be added to these specifications in some sort of appendix or addendum. Alternatively, manufacturers could choose to implement a dying gasp or similar kind of functionality on top of any of the existing PON standards, without affecting standards compatibility. In this case, the dying gasp functionality described herein might be applicable as well. Other PON standards to which this technology could apply might include (but are not limited to) the ITU-T APON, BPON, GPON, NG-PON1 specifications, the IEEE EPON/GE-PON, and the like.

To the extent that other non-PON or non-optical media based communications standards and/or protocols rely on transmission media that do not experience immediate faults (i.e., that might experience degradation over an identifiable period), the techniques described herein might also be applicable. For example, the various embodiments might be applicable to the Cable-/DOCSIS-specific RFoG and EPoC specifications, which might be based on co-axial cable or other cable type transmission media. Furthermore, this technology could apply to FiG (Fiber in Gas) deployments as well. Moreover, the use of a dying gasp as discussed here is also applicable to Active Ethernet architectures and potentially several forms of Backhaul architectures. Although current discussion in the field (e.g., as part of the emerging FSAN NG-PON2 standard (Next-Generation 2 Passive Optical Network)) might be directed to dying gasps indicating failure to routing devices, or other relaying components in the PON, such discussions do not cover dying gasps indicating failure of the transmission media between these routing devices or other relaying components in the PON. In fact, the various embodiments described herein supplement the current developments in the emerging FSAN NG-PON2 standard, and the like.

The accuracy of the time stamp information on the dying gasps can influence the degree of spatial resolution for impairment isolation are possible. Merely by way of example, in some cases, resolution in the 20 cm range might require time accuracy within 1 nanosecond. In other cases, resolution in the 200 m range might require time accuracy within 1 microsecond. The degree of time accuracy might depend on the network elements themselves.

It is important to note that using the dying gasp need not necessarily replace the use of dedicated OTDR hardware (regarding impairment isolation). In many ways, these items could be seen as complementary. In some aspects, the techniques described herein can be seen as a first order software-driven approach to impairment isolation. Dedicated OTDR hardware (whether provided in handheld units for field or repair technicians) or integrated in equipment that carriers deploy might provide additional information about fiber impairments as well additional accuracy in fiber fault location.

A significance of the techniques and embodiments described herein might include a potential to reduce operational expenses ("OPEX") (e.g., maintenance costs, etc.) by simplifying troubleshooting and fault detection in the fiber access network, a potential to reduce ("CAPEX") (e.g., infrastructure costs, etc.) in cases where carriers do not require added precision of dedicated OTDR hardware. An example of such a scenario where carriers do not require added precision of dedicated OTDR hardware might include a carrier with a large amount of aerial Outside Plant (OSP). In such cases, the sources of fiber faults may often be plainly visible, e.g., fallen pole, branch, or tree, and a rough location of the fiber fault by fiber segment may be entirely sufficient.

FIG. 1 provides a schematic illustration of one embodiment of a computer system 100 that can perform the methods provided by various other embodiments, as described herein, and/or can function as an Operations Support System, a network element, and/or the like. It should be noted that FIG. 1 is meant only to provide a generalized illustration of various components, of which one or more (or none) of each may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input devices 115, which can include without limitation a mouse, a keyboard and/or the like; and one or more output devices 120, which can include without limitation a display device, a printer and/or the like.

The computer system 100 may further include (and/or be in communication with) one or more storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 100 might also include a communications subsystem 130, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 130 may permit data to be exchanged with a network (such as the network described below, to name one example), with other computer systems, and/or with any other devices described herein. In many embodiments, the computer system 100 will further comprise a working memory 135, which can include a RAM or ROM device, as described above.

The computer system 100 also may comprise software elements, shown as being currently located within the working memory 135, including an operating system 140, device drivers, executable libraries, and/or other code, such as one or more application programs 145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 125 described above. In some cases, the storage medium might be incorporated within a computer system, such as the system 100. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 100) to perform methods in accordance with various embodiments of the invention. According to a set of embodiments, some or all of the procedures of such methods are performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another computer readable medium, such as one or more of the storage device(s) 125. Merely by way of example, execution of the sequences of instructions contained in the working memory 135 might cause the processor(s) 110 to perform one or more procedures of the methods described herein.

The terms "machine readable medium" and "computer readable medium," as used herein, refer to any medium that participates in providing data that causes a machine to operate in a specific fashion. In an embodiment implemented using the computer system 100, various computer readable media might be involved in providing instructions/code to processor(s) 110 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 125. Volatile media includes, without limitation, dynamic memory, such as the working memory 135. Transmission media includes, without limitation, coaxial cables, copper wire and fiber optics, including the wires that comprise the bus 105, as well as the various components of the communication subsystem 130 (and/or the media by which the communications subsystem 130 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc. carried by the signals) to the working memory 135, from which the processor(s) 105 retrieves and executes the instructions. The instructions received by the working memory 135 may optionally be stored on a storage device 125 either before or after execution by the processor(s) 110.

Figure 2:
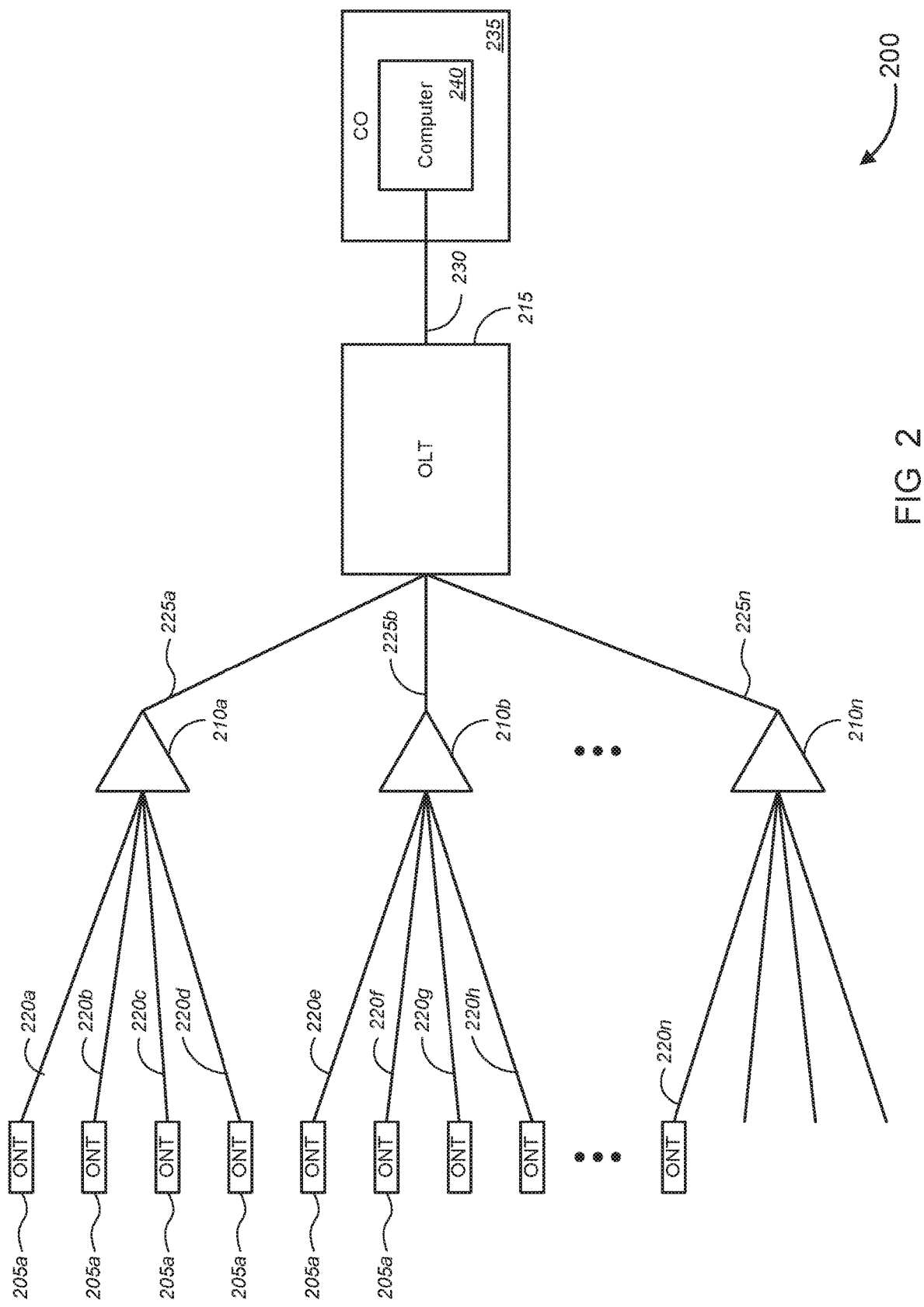
FIG. 2 is a block diagram illustrating a passive optical network, in accordance with various embodiments.

Turning to FIG. 2, which is a general schematic diagram illustrating a basic PON system 200, in accordance with various embodiments. In FIG. 2, PON system 200 might comprise a plurality of optical network terminals ("ONT") 205, a plurality of passive optical splitters 210, and an optical line terminal ("OLT") 215. The plurality of ONT 205 might comprise ONTs 205a-205n. Although only nine ONTs are shown in FIG. 2, any suitable number may be implemented. The plurality of passive optical splitters 210 might comprise splitters 210a-210n. Although only three splitters are shown in FIG. 2, any suitable number may be implemented. Moreover, although only four ONTs 205 are shown coupled to each splitter 210, any suitable number of ONTs 205 may be coupled to each splitter 210. Although only one OLT 215 is shown, any suitable number of OLTs may be implemented.

PON system 200 might further comprise a plurality of drop fibers 220 (which might include, without limitation, drop fibers 220a-220n shown in FIG. 2), a plurality of distribution fibers 225 (which might include, without limitation, distribution fibers 225a-225n), and a backhaul fiber 230. Each of the plurality of drop fibers 220 might couple each splitter 210 with each ONT 205. Likewise, each of the plurality of distribution fibers 225 might couple each splitter 210 with the OLT 215. The backhaul fiber 230 might couple the OLT with a central office (CO) 235. Although not described in detail herein, the CO typically will feature a number of network elements for distributing signals throughout the PON 200; such network elements are well known to those skilled in the art. In particular, however, the CO might feature a computer 240 (which might be a standalone computer or might be part of one of the network elements at the CO), which can be programmed to receive dying gasp communications from various other network components and analyze those communications, as described in further detail herein. (It should be noted that a computer capable of performing these functions, whether a standalone computer or part of another network element, can also be located at other locations within the PON 200, in accordance with different embodiments.)

In operation, data might be transmitted via the optical fibers 220, 225, and 230 from the CO to each ONT 205 via the OLT 215 and the splitters 210.

Figure 3:
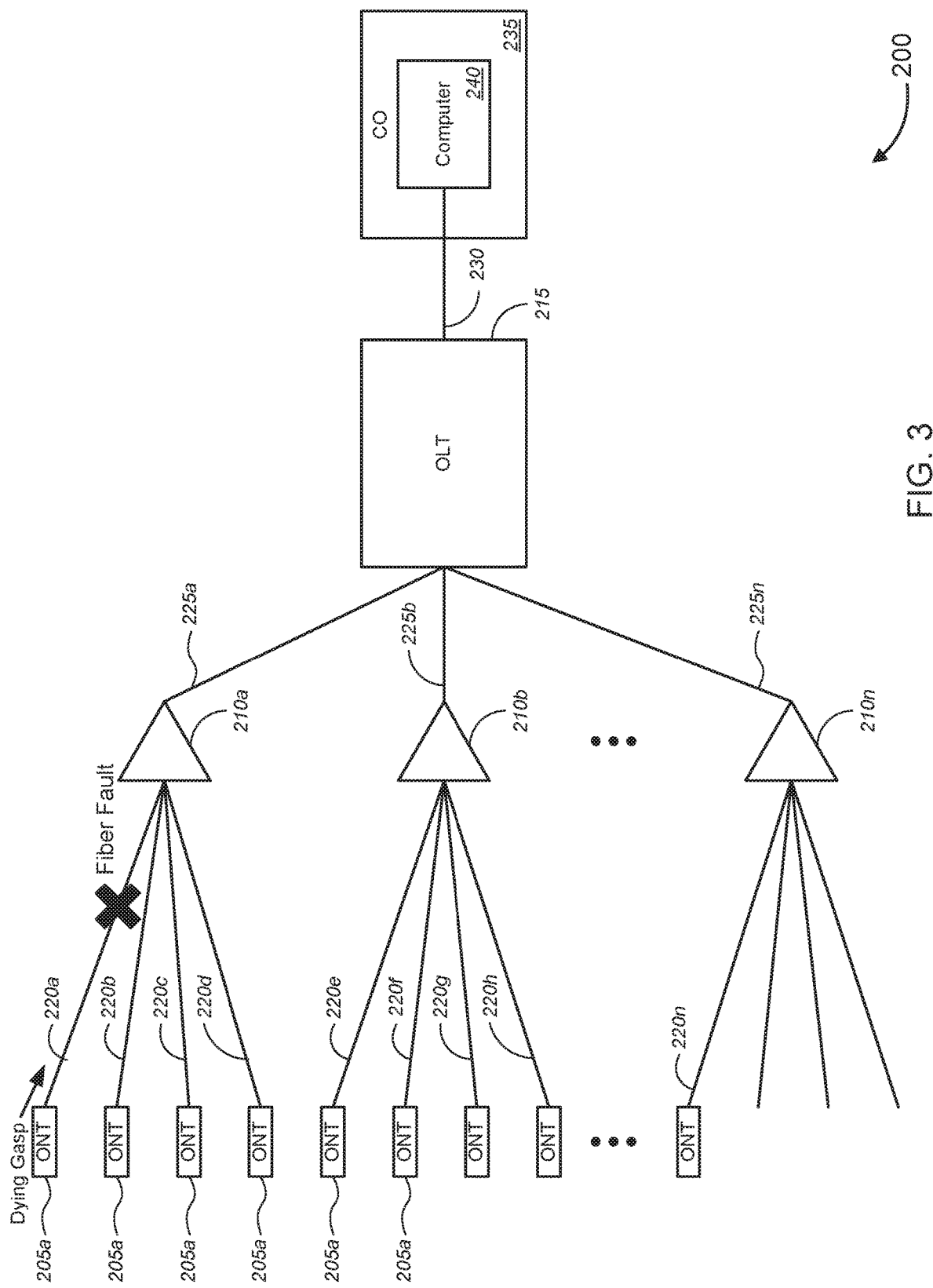
FIGS. 3-5 illustrate network impairments at various locations in the network of FIG. 2.
Figure 4:
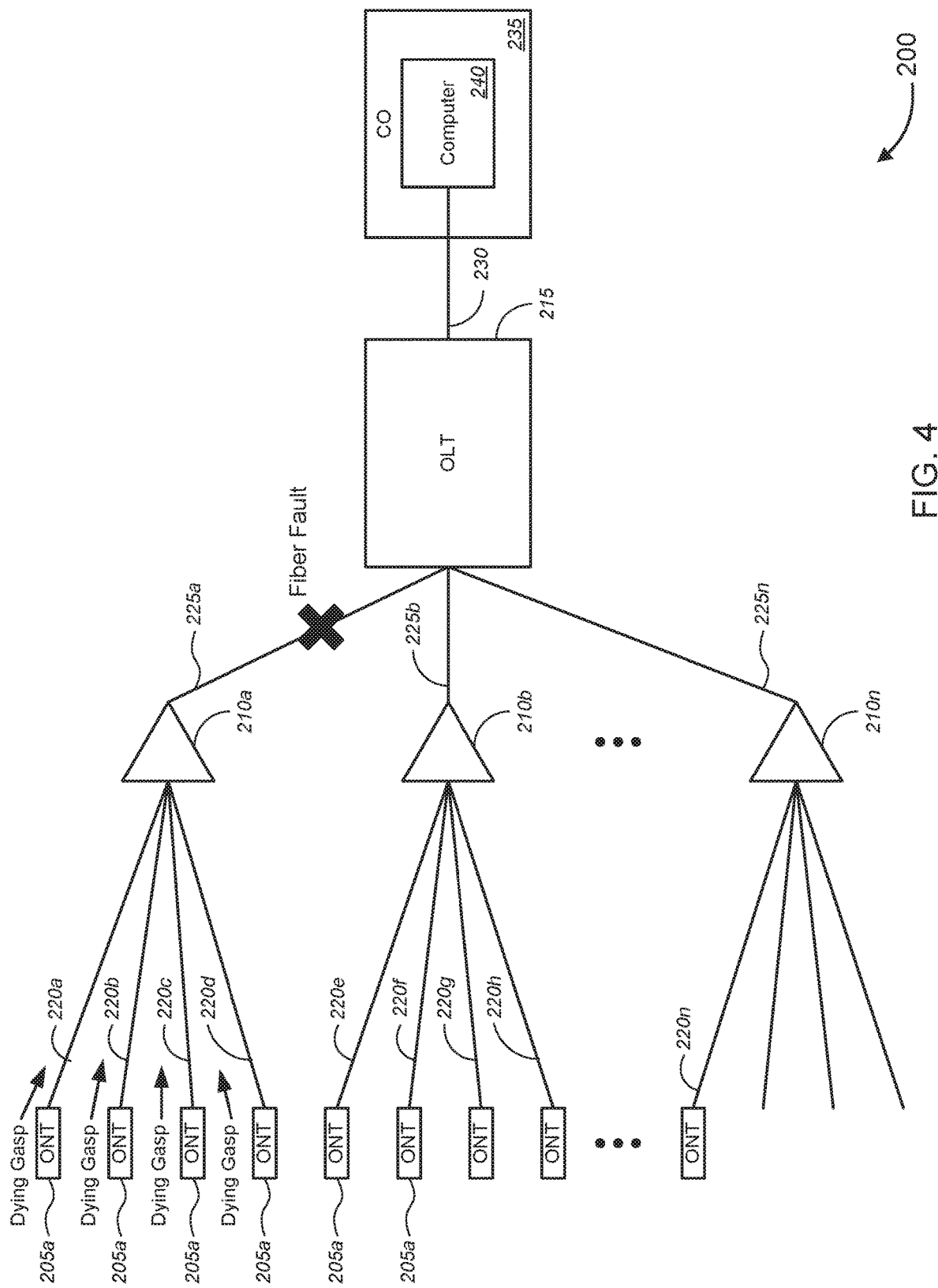
Figure 5:
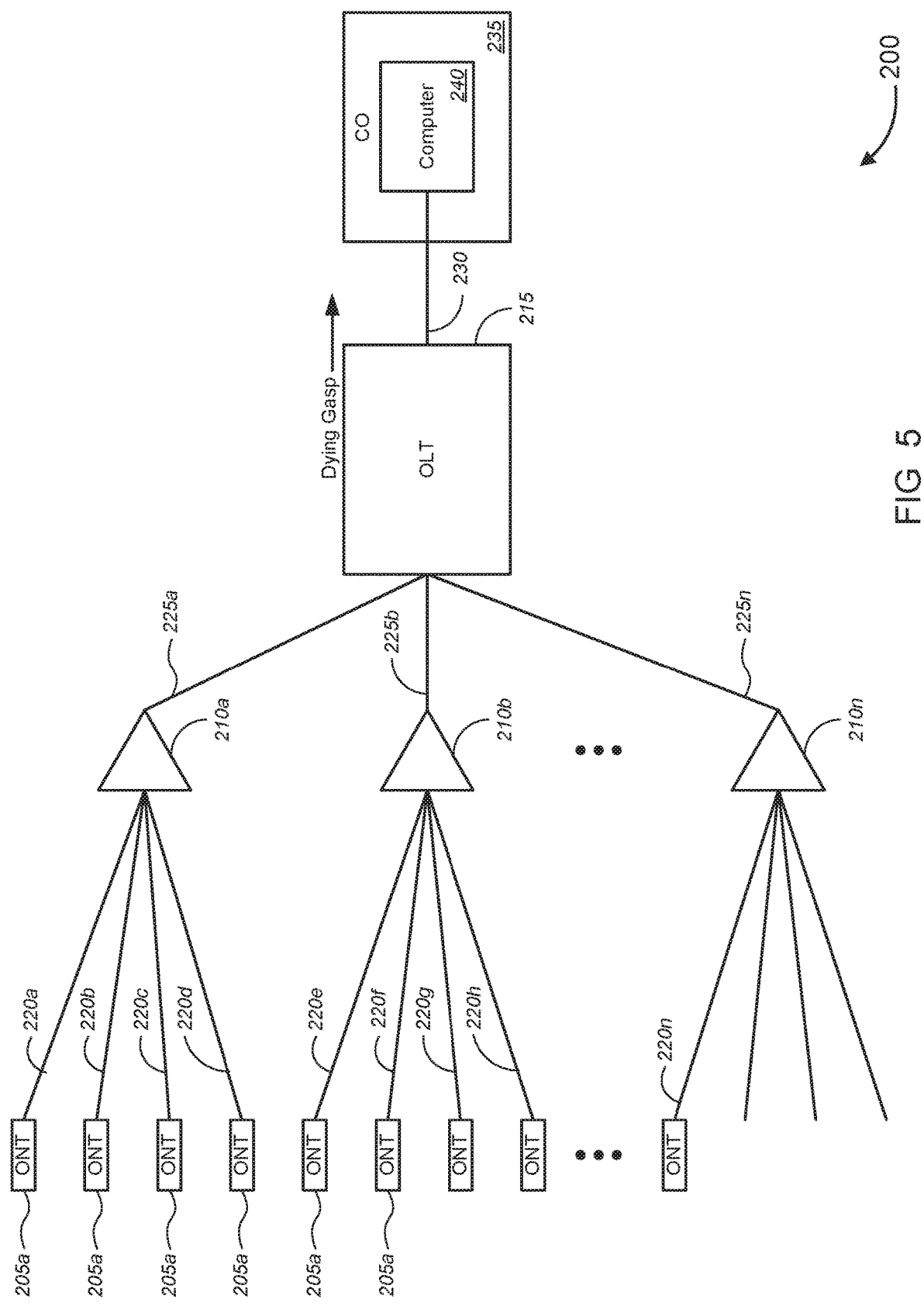

FIGS. 3-5 below illustrate faults occurring at various locations in the PON system shown in FIG. 2.

FIG. 3 is a general schematic diagram illustrating a fault in a drop fiber to an ONT in a PON system 200, in accordance with various embodiments. In FIG. 3, a fault might occur in drop fiber 220a between ONT 205a and splitter 210a. As the fault might be occurring (which might include, without limitation, a cut, a bend, a break, a kink, or the like) until all connection is lost, signal degradation might be observed at the receiving ONT (in this case, at ONT 205a). In response to such detection of signal degradation, ONT 205a might send a dying gasp signal to the CO via splitter 210a and OLT 215 prior to all connection being lost due to the fault. In this manner, the CO might be able to identify that the fiber fault occurred along drop fiber 220a, and thus can more easily and more readily initiate necessary repairs or replacement of the broken fiber. At a suitable protocol or management system level, the OSS can correlate the identification number of the ONT that sent out the dying gasp and infer the drop fiber segment associated with it.

FIG. 4 is a general schematic diagram illustrating a fault in a distribution fiber to a PON splitter in a PON system 200, in accordance with various embodiments. In FIG. 4, the fault might occur at distribution fiber 225a. In this case, one or more of the ONTs 205a-205d might send a dying gasp signal to the CO via splitter 210a and OLT 215. Upon receiving simultaneous or near simultaneous dying gasp signals from the one or more ONTs 205a-205d coupled to the splitter 210a, it might be determined that the fiber fault might have occurred at distribution fiber 225a, and appropriate repairs or replacement might be initiated. This is especially so in the case that drop fibers 220a-220d are located apart from each other so that a simultaneous cut of all four drop fibers 220a-220d is not likely to have occurred.

More particularly, a fiber fault in the distribution fiber to the PON splitter can be determined by correlating multiple dying gasps from ONTs contained within the same group (e.g., ONT 205a-205d in this particular example). In some cases, where dying gasps of multiple ONTs might be simultaneously or near simultaneously received, a possible cause might be a cutting of multiple fiber lines between the multiple ONTs and a splitter, which might occur due to their physical proximity when being laid. Such simultaneous or near simultaneous receipt of dying gasps might appear to be a cut between the splitter and the ONTs/ONUs. One method of determining where the fault might lie might include determining the locations of all the ONTs sending the dying gasps, and correlating with timings of the dying gasps as well as proximal locations to eliminate possible types of fault (i.e., by eliminating faults between ONTs and splitters, eliminating faults between splitters and OLTs, not eliminating any of these possibilities, or the like). For example, if two optical lines are separated by some distance (e.g., are in separate neighborhoods), then they cannot have been simultaneously cut by the same person or object.

FIG. 5 is a general schematic diagram illustrating a fault in a backhaul fiber from OLT in a PON system 200, in accordance with various embodiments. In FIG. 5, the fault might occur at the backhaul fiber 230. In this case, the OLT 215 might send a dying gasp signal to the CO prior to all connection being lost in fiber 230. In some cases, some or all of the ONTs 205 coupled to the OLT 215 might each send dying gasp signals prior to all connection being lost in backhaul fiber 230. In this manner, the CO 235 might be able to more easily determine based on the dying gasp signals, based the identifications of the ONTs 205, OLT 215, and the like, and based on the timings of the dying gasp signals where the likely location of the fault might be. Accordingly, appropriate repairs and/or replacement might be initiated.

Figure 6:
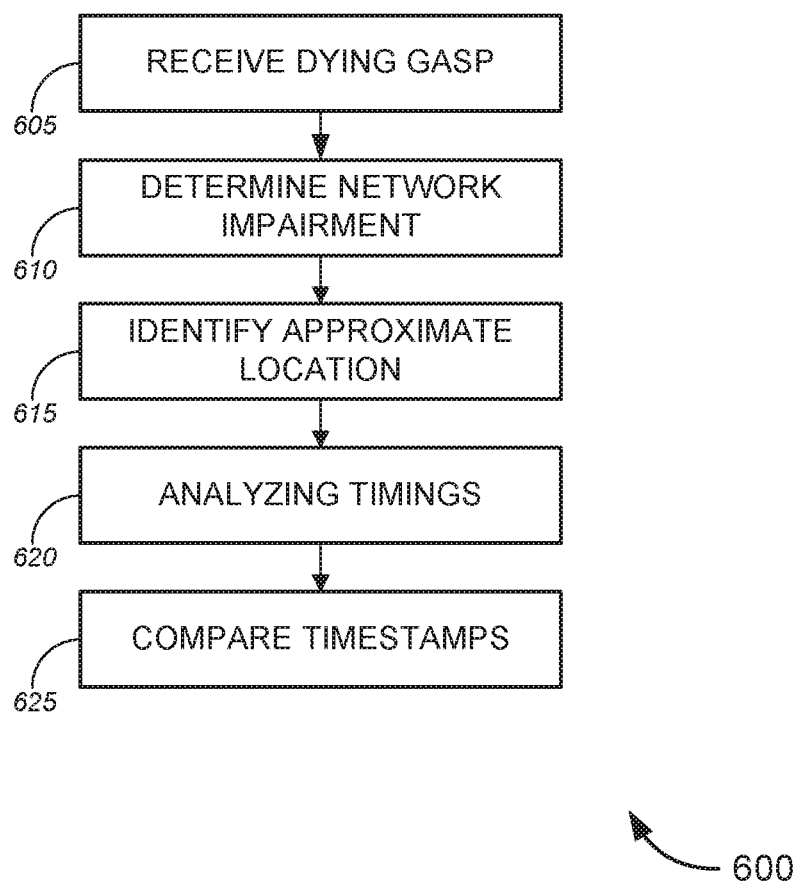
FIG. 6 is a process flow diagram illustrating a method of estimating a location of an impairment in a network, in accordance with various embodiments.

FIG. 6 illustrates a method 600 of estimating a location of fiber impairment in an optical network. It should be appreciated that the various techniques and procedures of this can be combined in any suitable fashion, and that, while the techniques and procedures are depicted and/or described in a certain order for purposes of illustration, certain procedures may be reordered and/or omitted within the scope of various embodiments. Moreover, while the method 600 can be implemented by (and, in some cases, is described below with respect to) the systems 100 and 200 of FIGS. 1 and 2 (or components thereof), these methods may also be implemented using any suitable hardware implementation. Similarly, while the systems 100 and 200 of FIGS. 1 and 2 (and/or components thereof) can operate according to the method 600 (e.g., by executing instructions embodied on a computer readable medium), the systems 100 and 200 can also operate according to other modes of operation and/or perform other suitable procedures.

The method 600 might comprise receiving one or more dying gasp communications (block 605). In some embodiments, the dying gasp communications might comprising at least one communication from a network element in a network. Examples of such communications are described above. In some cases, the method 600 might further comprise determining that a network impairment has occurred (block 610). In many cases, this determination can be based, at least in part, on the received dying gasp communications. At block 615, the method 600 can include identifying an approximate location of the network impairment.

As noted above, a variety of techniques can be used to analyze the dying gasp communications to identify the approximate location of the impairment. For instance, in some cases, the method 600 might include analyzing relative timings of two or more dying gasp communications (block 620). Alternatively and/or additionally, as described in detail above, each dying gasp communication might have a time stamp, and identifying an approximate location of the network impairment might comprise analyzing time stamps of the one or more dying gasp communications (block 630). For instance, time stamps of multiple communications could be compared, and/or if the time stamps were cyclical, a single time stamp, along with a known location of the device that sent the communication, could be used to determine an approximate location of the impairment.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

receiving, at a computer, one or more dying gasp communications from one or more network elements, wherein the one or more dying gasp communications are sent based upon a detection of a degradation of a transmission signal, and wherein each of the one or more of dying gasp communications comprises a time stamp;

determining, at the computer, based at least in part on the one or more dying gasp communications, that a network impairment has occurred; and identifying, at the computer, based at least in part on analyzing the time stamps of the one or more dying gasp communications received, an approximate location of the network impairment, wherein at least one of:

the one or more dying gasp communications comprise a plurality of dying gasp communications from a plurality of first optical network terminals ("ONTs") and wherein identifying an approximate location of the network impairment comprises identifying that the network impairment has occurred in a distribution line to a splitter serving the plurality of ONTs; or the one or more dying gasp communications comprise one or more dying gasp communications from a second ONT, and wherein identifying an approximate location of the network impairment comprises identifying that the network impairment has occurred in a fiber drop to a subscriber premises.

2. The method of claim 1, wherein the one or more dying gasp communications further comprise a dying gasp communication from an optical line terminal ("OLT"), and wherein identifying an approximate location of the network impairment comprises identifying that the network impairment has occurred in a backhaul from the OLT to a central office.

3. The method of claim 1, wherein the one or more dying gasp communications comprise a plurality of dying gasp communications, the plurality of dying gasp communications comprising at least one communication from each of a plurality of network elements in a passive optical network, the plurality of network elements comprising an ONT.

4. The method of claim 3, further comprising analyzing timings of the plurality of dying gasp communications to identify an approximate location of the network impairment.

5. The method of claim 1, further comprising comparing time stamps of two or more dying gasp communications.

6. The method of claim 1, wherein the time stamps comprise one or more time stamps associated with known lengths of deployed fiber segments.

7. The method of claim 1, wherein each time stamp is a cyclical time stamp.

8. The method of claim 7, wherein each time stamp is a counter.

9. The method of claim 8, wherein the counter comprises a specified number of bits.

10. The method of claim 8, wherein the counter has a specified resolution.

11. The method of claim 1, wherein a network comprising the one or more network elements is a passive optical network ("PON").

12. A system for estimating a location of fiber impairment in an optical network, the system comprising:
a computer system comprising:
one or more processors; and
a non-transitory computer readable medium in communication with the one or more processors, the computer readable medium having encoded thereon a set of instructions executable by the computer system to:
receive one or more dying gasp communications from one or more network elements, wherein the one or more dying gasp communications are sent based upon a detection of a degradation of a transmission signal, and wherein each of the one or more of dying gasp communications comprises a time stamp;
determine, based at least in part on the one or more dying gasp communications, that a network impairment, in a transmission medium in the network, has occurred;
identify, based at least in part on analyzing the time stamps of the one or more dying gasp communications received, an approximate location of the network impairment; and
one or more network elements in communication with the computer system, wherein each of the one or more network elements are configured to generate dying gasp communications indicating network impairments;
wherein the one or more dying gasp communications comprise at least one communication from at least one of the one or more network elements,
wherein at least one of:
the one or more dying gasp communications comprise a plurality of dying gasp communications from a plurality of first optical network terminals ("ONTs") and wherein identifying an approximate location of the network impairment comprises identifying that the network impairment has occurred in a distribution line to a splitter serving the plurality of ONTs; or
the one or more dying gasp communications comprise one or more dying gasp communications from a second ONT, and wherein identifying an approximate location of the network impairment comprises identifying that the network impairment has occurred in a fiber drop to a subscriber premises.

13. The system of claim 12, wherein the set of instructions further comprise instructions to analyze timings of the plurality of dying gasp communications to identify an approximate location of the network impairment.

14. The system of claim 12, wherein the computer system is part of a service provider central office.

* * * * *